United States Patent

Tippmann et al.

[11] Patent Number: 5,584,188
[45] Date of Patent: Dec. 17, 1996

[54] REFRIGERATED BEVERAGE TRAILER

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 450,030

[22] Filed: May 25, 1995

[51] Int. Cl.[6] .................................................. B60H 1/32
[52] U.S. Cl. ............................ 62/239; 62/390; 62/457.9; 222/146.6
[58] Field of Search ........................... 222/146.6; 62/239, 62/389, 390, 323.1, 457.9; 52/143, 309.9

[56] References Cited

U.S. PATENT DOCUMENTS

| | | | |
|---|---|---|---|
| 3,089,313 | 5/1963 | Fix | 62/239 |
| 3,232,489 | 2/1966 | Buffington | 222/146.6 X |
| 3,237,810 | 3/1966 | Gran | 222/146.6 |
| 4,225,059 | 9/1980 | Kappos | 222/146.6 |
| 4,873,841 | 10/1989 | Bradwhaw et al. | 62/239 |
| 4,976,448 | 12/1990 | Wickersham et al. | 62/239 X |
| 5,175,970 | 1/1993 | Green | 52/309.9 |

*Primary Examiner*—William E. Tapolcai
*Attorney, Agent, or Firm*—Joseph J. Baker

[57] ABSTRACT

A refrigerated beverage trailer is disclosed having floor, wall and roof members formed of polyurethane with a covering layer of fiberglass reinforced resinous material to form a monolithic enclosure with a closure member. Beverage dispensing spigots are provided on the side of the enclosure and a wheel and hitch assembly is secured to the floor member by the same resinous material.

4 Claims, 2 Drawing Sheets

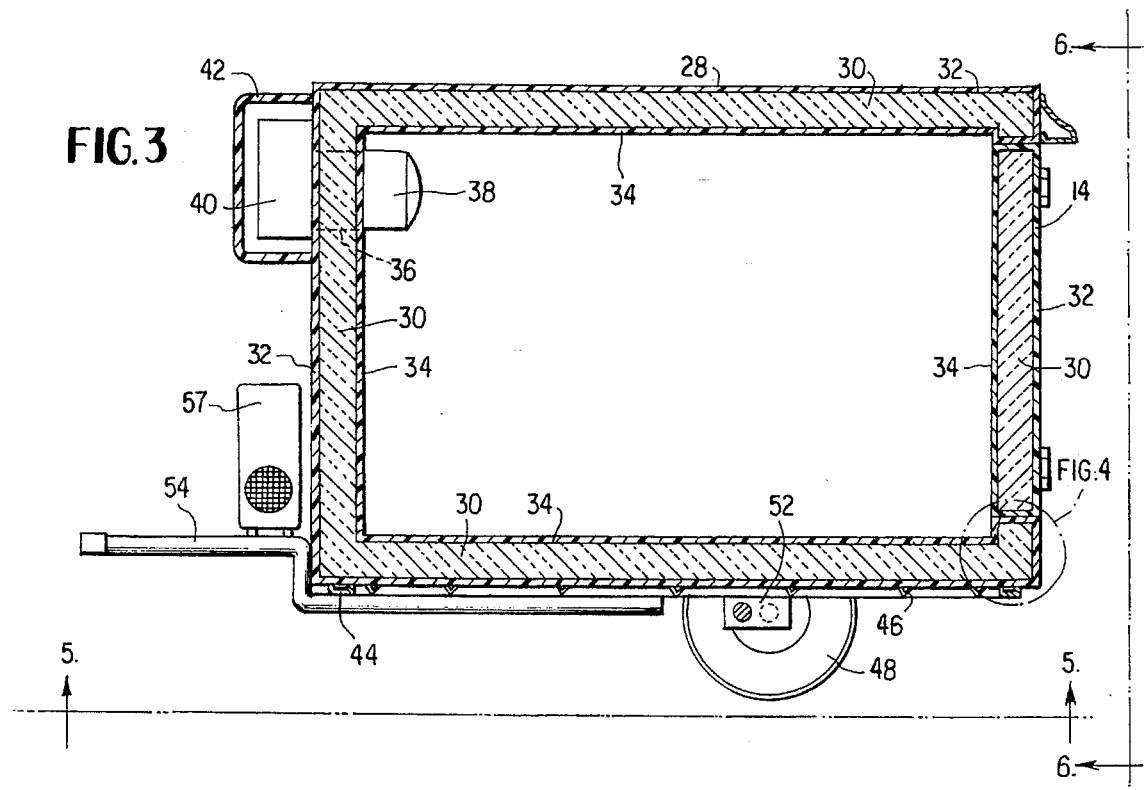
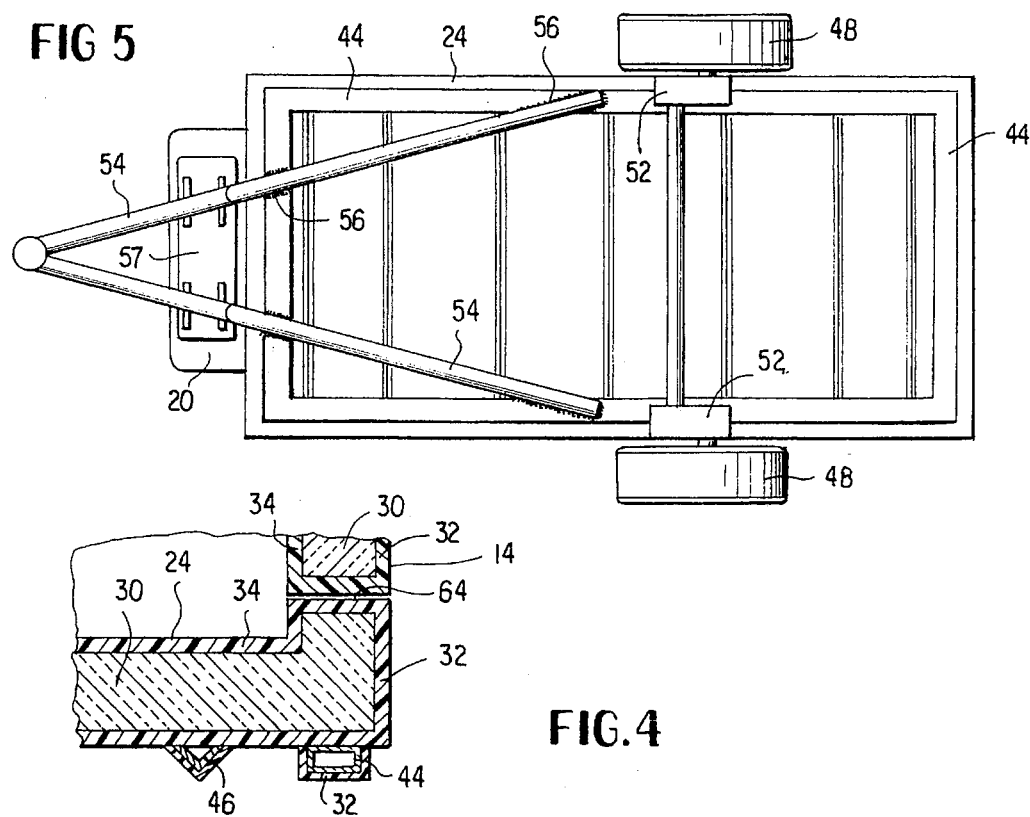

5,584,188

REFRIGERATED BEVERAGE TRAILER

BACKGROUND OF THE INVENTION

This invention relates to trailers and more specifically to a monolithic refrigerated trailer enclosure formed of polyurethane covered entirely with a layer of fiberglass reinforced resinous material, laving means for dispensing beverages on the sides thereof and a wheel and trailer hitch assembly secured thereto by the same resinous material.

Insulated trailers equipped with refrigeration units are well known, an example thereof being disclosed in U.S. Pat. No. 4,553,403. These trailers typically have thermally insulated walls, roof and floor and have an opening in the end thereof for mounting a refrigeration unit. The wheel and hitch assembly is normally secured to a metal frame in the manner shown in U.S. Pat. No. 3,003,810.

Such frames are usually secured to the floor member by a plurality of fasteners which extend through the floor. The wall, roof and floor members can have a core of fiberglass or polyurethane insulation with an outer and inner layer of either sheet metal or hard, impervious, resin material as shown in the aforementioned patents. Such construction of the refrigerated insulated trailers of the prior art had numerous drawbacks which centered primarily around their inability to seal the joints where the outer metal or hard resin material sheets come together which resulted in moisture entering the core material to either cause disintegration or saturation thereof. In addition, the fasteners used to secure the under frame to the floor member often penetrate the sheet metal or hard resin material surface that faces the interior of the trailer. This enables moisture to enter the core of the floor member particularly when the inside of the trailer is being washed. These and other disadvantages of insulated, refrigerated trailers of the prior art are overcome by the unique construction techniques of the present invention.

It is therefore the primary object of the present invention to provide a superior insulated, refrigerated trailer and method of making same suitable for storing and dispensing cold beverages.

It is another object of the present invention to provide an insulated beverage trailer and method of making same that is constructed entirely of polyurethane and fiberglass reinforced resinous material.

It is yet another object of the present invention to provide a monolithic structure in the form of a trailer without seams or joints that can leak.

It is a further object to provide an insulated, self-contained refrigerated trailer and method of making same having beverage dispensing means on the sides thereof and a wheel and trailer hitch assembly secured thereto by the same resinous material forming the trailer inner and outer surfaces.

It is a still further object to provide an insulated beverage trailer which is relatively inexpensive to construct and which is extremely rigid due to its monolithic construction.

These and other objects, advantages and features of the present invention will be more fully set forth in the detailed description which follows.

BRIEF DESCRIPTION OF THE DRAWINGS

FIG. 3 is a cross-sectional view taken along the lines 3—3 of FIG. 2;

FIG. 4 is an enlarged view of a part of the trailer encircled in FIG. 3;

FIG. 5 is a plan view of the bottom of the trailer looking along the lines 5—5 of FIG. 3.

DESCRIPTION OF THE PREFERRED EMBODIMENT

Figure 1:
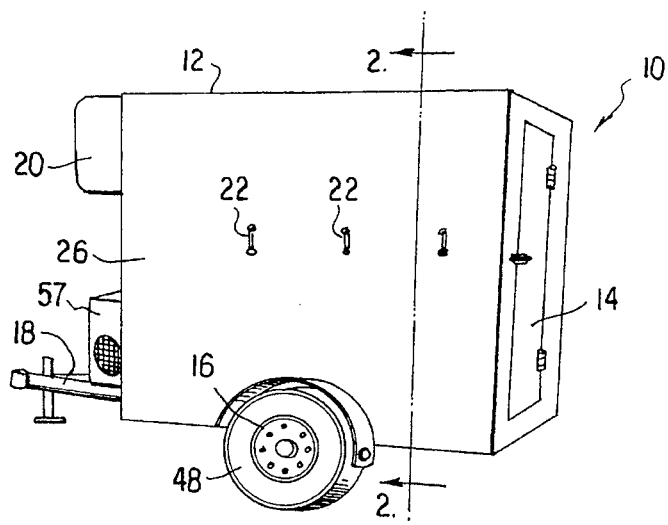
FIG. 1 is a perspective view of the refrigerated and insulated beverage trailer of the present invention.

Referring now to the drawings where like characters of reference indicate like elements in each of the several views, 10 is the insulated, refrigerated, monolithic beverage trailer of the subject invention. The trailer 10 comprises a housing 12 having a door 14, a wheel set 16, a trailer hitch 18 and a refrigeration unit 20. The housing 12 has a plurality of spigots 22 for dispensing beverages stored within the trailer, as will be more fully explained later.

Figures 2, 6:
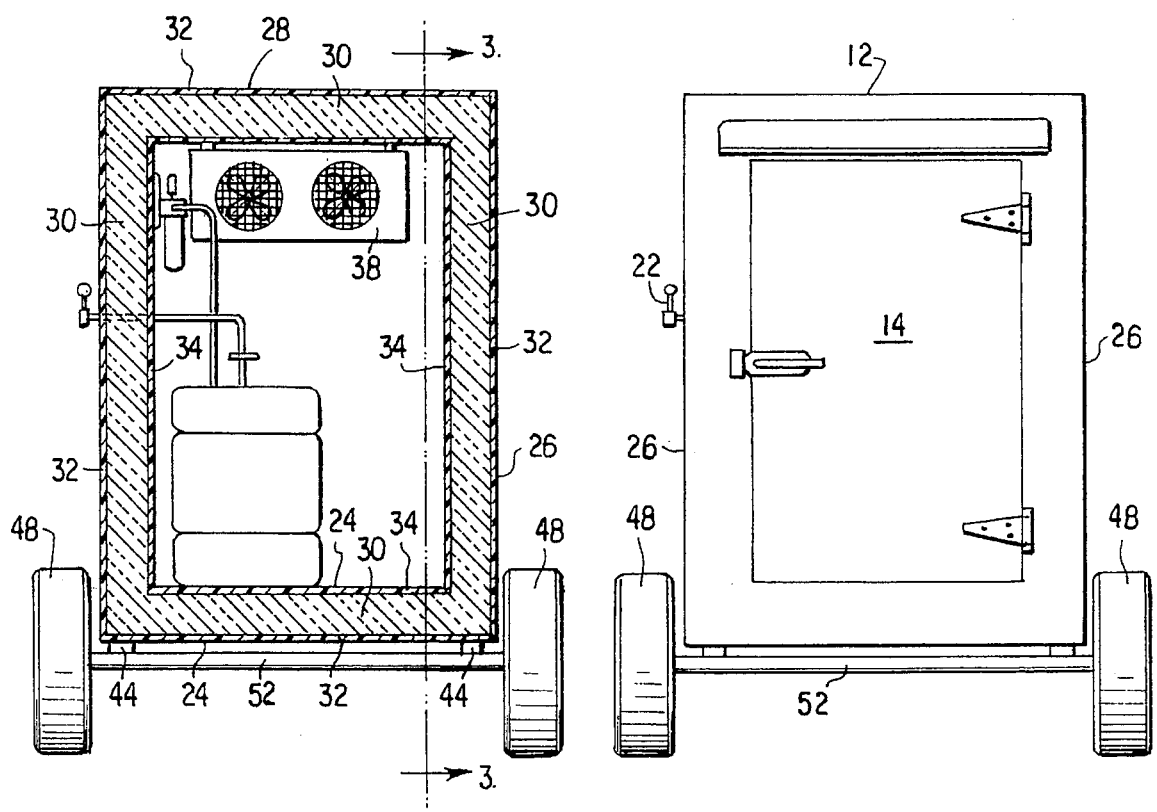
FIG. 2 is a cross-sectional view taken along the lines 2—2 of FIG. 1.
FIG. 6 is an end elevational view of the trailer taken along the lines 6—6 of FIG. 3.

FIGS. 2 and 3 show the housing 12 comprising a floor member 24, a wall member 26 and a ceiling member 28, all of which are formed of a polyurethane foam core material 30. The core 30 of polyurethane has a continuous, seamless outside layer 32 of fiberglass reinforced resinous material and a similar continuous, seamless inside layer 34 on the core 30 of the same resinous material to form the floor, wall and ceiling o members 24, 26 and 28, respectively. The closure member or door 14 is swingably mounted and is similar in construction to wall member 26 with a core 30 of polyurethane and an encasing layer 32, 34 of fiberglass reinforced resinous material. An aperture 36 is provided through one wall for receiving the evaporator 38 of a refrigeration system 40 mounted on the outside wall of the trailer for cooling the interior of the trailer and its contents. A removable cover 42 is provided to enclose the refrigeration system 40 and provide an aerodynamic shape to reduce air resistance when the trailer is moving.

As shown in FIGS. 3, 4 and 5, the floor member 24 is secured to a rectangular-shaped frame member 44 extending substantially adjacent the peripheral edge of the floor member. A plurality of ribs 46 are located between the longitudinally extending elements of the frame 44 and are secured thereto by welding or the like. As can best be seen in FIG. 4, the frame member 44 and ribs 46 are secured to the floor member 24 by means of the same fiberglass reinforced resinous material comprising the outside layer 32 of the floor member as will be more fully described later. By so securing the frame member 44 and ribs 46 by means of the resinous material, no fasteners in the form of bolts and the like are used which would penetrate the floor member 24 that, in turn, could lead to fluid leakage into the core material 30 should there be spillage inside the trailer. Tires 48 are mounted on a wheel set 50 which in turn is secured to a torsion-bar spring assembly 52. The spring assembly 52 is attached to the frame member 44. A conventional hitch assembly 54 is also secured to the frame member 44 by weldments 56. A gasoline powered electric generator 57 is also provided mounted on the hitch assembly 54 which can supply electricity to the refrigeration system 40 in the absence of an outside source.

The spigots 22 are secured to a wall member 26 in spaced-apart relationship and are typically connected by piping 58 to a beverage source 60 such as a keg of beer. The keg 60 is pressurized from a source (not shown) via a regulator 62.

Applicants have thus described the construction of their unique monolithic, insulated beverage trailer, the method of such construction will now be described.

The method of constructing the trailer 10 comprises the provision of a rectangular-shaped, horizontally extending panel(s) of polyurethane foam material approximately 4 to 6 inches in thickness and having a flat upper and lower surface to form the floor member 24.

A frame member 44, also rectangular in shape, is then positioned on the upper surface and a layer of fiberglass reinforced resinous material 30 is applied to the lower surface of the panel and over the frame member 44 to secure the frame to the material 30. The wheel set 50, spring assembly 52 and hitch assembly 54 are then secured to the frame member 44. The floor member 24 is then inverted onto the frame member 44 and panels of polyurethane material are erected vertically adjacent the peripheral edge of the floor panel to form the wall member 26.

A panel(s) of polyurethane foam material is then positioned on the wall member 26 to form the ceiling member 28. A continuous layer of fiberglass reinforced resinous material is then applied to the entire inner and outer surfaces of the wall and roof panels and the upper surface of the floor panel to form the monolithic, insulated enclosure forming the trailer of the present invention. The side walls of the aperture 36 and door jamb 64 are also covered with the same layer of fiberglass reinforced resinous material.

The foregoing description of the invention has been presented for purposes of illustration and description. Further, the description is not intended to limit the invention to the form disclosed herein. Consequently, variations and modifications commensurate with the above teachings, in the skill or knowledge of the art, are within the scope of the invention. It is intended that the appended claims be construed to include alternative embodiments to the extent permitted by the prior art.

What we claim is:

1. A refrigerated beverage trailer comprising:

a) an enclosure formed by a floor member, a wall member on said floor member having an opening to provide access to said enclosure and a roof member on said wall member, said floor, wall and roof members having a core of polyurethane and an inside and outside covering layer of fiberglass reinforced resinous material over said core to thereby form a monolithic enclosure structure, b) a closure member for said opening, c) means mounted on said wall member to refrigerate the inside of said enclosure, d) means mounted on said wall member to dispense a beverage therefrom, and e) a wheel and hitch assembly secured to a frame means, said frame means being secured to said floor member by means of said fiberglass reinforced resinous material.

2. A trailer as set forth in claim 1 wherein said wheel and hitch assembly is secured to said frame means by weldments and generator means is mounted on said hitch assembly to supply electrical power to said refrigeration means.

3. A refrigerated beverage trailer comprising:

a) an insulated enclosure formed by a floor member, a wall member on said floor member having an opening to provide access to said enclosure and a roof member on said wall member, said floor, wall and roof members having a core of polyurethane and a continuous, seamless inside and outside covering layer of fiberglass reinforced resinous material over said core to thereby form a watertight monolithic enclosure structure, b) a closure member for said opening, c) means mounted on said wall member to refrigerate the inside of said enclosure, d) means mounted on said wall member to dispense a beverage therefrom, and e) a wheel and hitch assembly secured to a frame means, said frame means being secured to said floor member by means of said fiberglass reinforced resinous material.

4. A trailer as set forth in claim 3 wherein said wheel and hitch assembly is secured to said frame means by weldments and generator means is mounted on said hitch assembly to supply electrical power to said refrigeration means.

* * * * *